(12) United States Patent
Namba et al.

(10) Patent No.: US 11,876,271 B2
(45) Date of Patent: Jan. 16, 2024

(54) METHOD AND APPARATUS FOR MANUFACTURING POWER GENERATING CELL STACK BODY

(71) Applicant: HONDA MOTOR CO., LTD., Tokyo (JP)

(72) Inventors: Kensuke Namba, Wako (JP); Ryo Takano, Wako (JP); Yosuke Konno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 17/392,513

(22) Filed: Aug. 3, 2021

(65) Prior Publication Data
US 2022/0140379 A1 May 5, 2022

(30) Foreign Application Priority Data
Aug. 6, 2020 (JP) ................................. 2020-133483

(51) Int. Cl.
*H01M 8/2475* (2016.01)
*H01M 8/248* (2016.01)
*H01M 8/1004* (2016.01)

(52) U.S. Cl.
CPC ....... *H01M 8/2475* (2013.01); *H01M 8/1004* (2013.01); *H01M 8/248* (2013.01)

(58) Field of Classification Search
CPC ... H01M 8/2475; H01M 8/248; H01M 8/1004
See application file for complete search history.

(56) References Cited

U.S. PATENT DOCUMENTS

| | | | | |
|---|---|---|---|---|
| 7,615,302 B2* | 11/2009 | Furukawa | ........... | H01M 8/2404 |
| | | | | 429/515 |
| 2006/0054269 A1* | 3/2006 | Nishi | .................. | H01M 8/0221 |
| | | | | 156/73.6 |
| 2015/0221971 A1 | 8/2015 | Watanabe | | |
| 2018/0138540 A1* | 5/2018 | Kakuwa | ............... | H01M 8/2475 |
| 2018/0366760 A1 | 12/2018 | Shimomura | | |
| 2019/0334194 A1* | 10/2019 | Sato | ...................... | H01M 8/248 |
| 2020/0251764 A1* | 8/2020 | Naito | .................. | H01M 8/2485 |

(Continued)

FOREIGN PATENT DOCUMENTS

| | | |
|---|---|---|
| CN | 104821410 A | 8/2015 |
| CN | 109103485 A | 12/2018 |

(Continued)

OTHER PUBLICATIONS

Office Action dated Nov. 10, 2023 issued over the corresponding Chinese Patent Application No. 202110901825.0 with the English machine translation thereof.

*Primary Examiner* — Nicholas P D'Aniello
*Assistant Examiner* — Mary G Henshaw
(74) *Attorney, Agent, or Firm* — Carrier, Shende & Associates P.C.; Joseph P. Carrier; Fulchand P. Shende

(57) ABSTRACT

In a preparation process of a method for manufacturing a power generating cell stack, a stacking table provided with a vibratable stack guide portion projecting upward and a stack unit provided with a positioning portion guided by the stack guide portion are prepared. In the placing step, the stack unit is stacked on the stacking table by dropping the stack unit toward the stacking table while the positioning portion is stacked along the stack guide portion which is vibrated in the vertical direction.

11 Claims, 9 Drawing Sheets

(56) References Cited

U.S. PATENT DOCUMENTS

2022/0077486 A1* 3/2022 Quinton ................ H01M 8/248
2022/0158218 A1* 5/2022 Janusch .............. H01M 8/2404
2022/0216503 A1* 7/2022 Scheb ............... H01M 10/0404

FOREIGN PATENT DOCUMENTS

| JP | H09-270267 A | 10/1997 |
|----|--------------|---------|
| JP | 2005-296746 A | 10/2005 |
| JP | 2013-157167 A | 8/2013 |
| JP | 5254878 B2 * | 8/2013 |

* cited by examiner

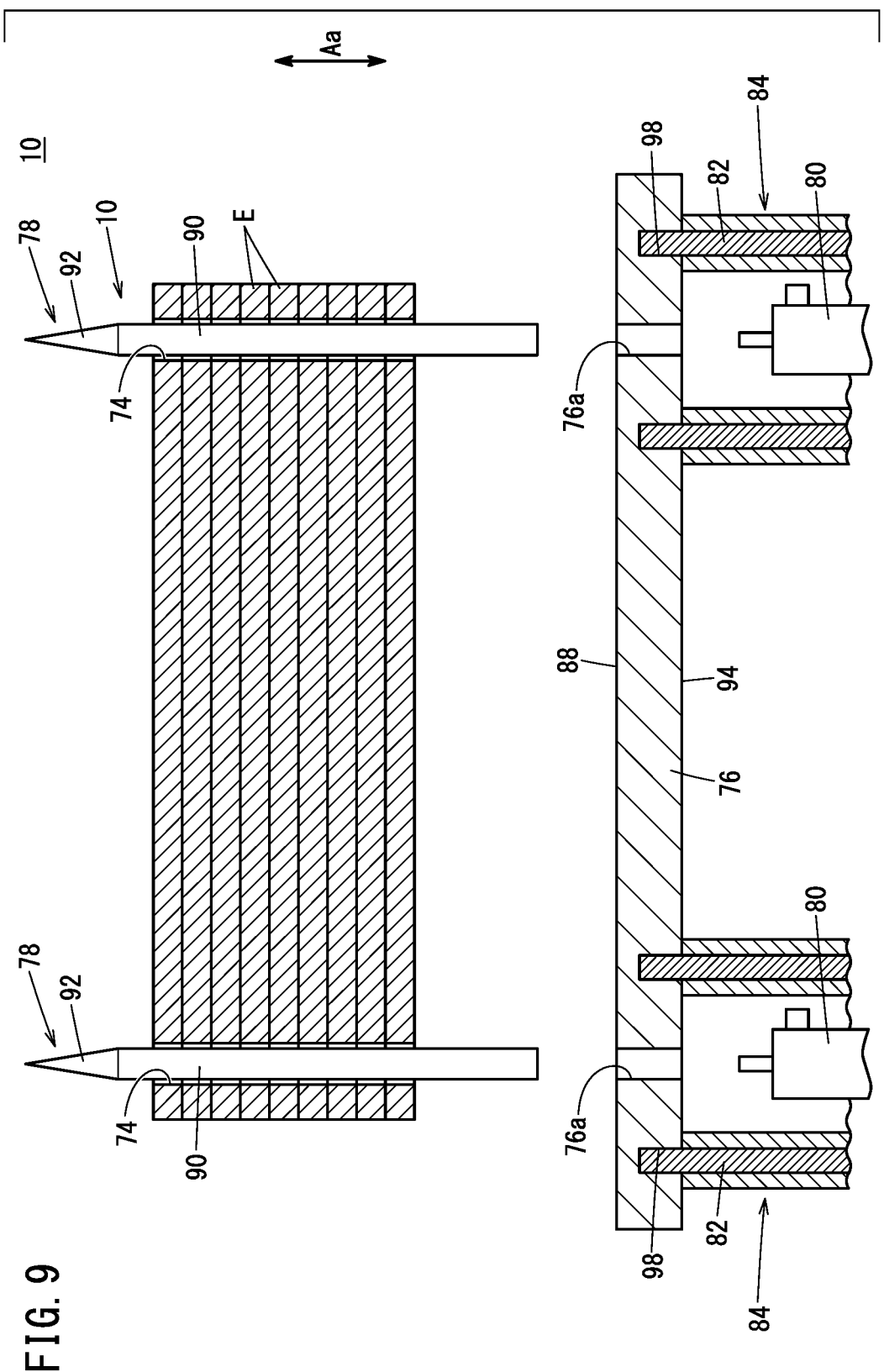

METHOD AND APPARATUS FOR MANUFACTURING POWER GENERATING CELL STACK BODY

CROSS-REFERENCE TO RELATED APPLICATION

This application is based upon and claims the benefit of priority from Japanese Patent Application No. 2020-133483 filed on Aug. 6, 2020, the contents of which are incorporated herein by reference.

FIELD OF THE INVENTION

The present invention relates to a method and an apparatus for manufacturing a power generating cell stack body.

DESCRIPTION OF THE RELATED ART

For example, a solid polymer electrolyte fuel cell includes a membrane electrode assembly (MEA). In the MEA, an anode is formed on one side of an electrolyte membrane formed of a polymer ion exchange membrane, and a cathode is formed on the other side. The membrane electrode assembly is sandwiched between separators from both sides to constitute a power generating cell. A fuel cell generally includes a power generating cell stack body in which tens to hundreds of power generating cells are stacked. The power generating cells are used, for example, as a vehicle fuel cell stack.

The fuel cell may include a so-called internal manifold. The internal manifold is configured to supply a fuel gas as a reaction gas to the anode electrode of each of the stacked power generating cells. The internal manifold is configured to supply an oxygen-containing gas as a reaction gas to the cathode electrode of each of the stacked power generating cells. For the fuel cell including the internal manifold, it is particularly required to ensure the sealing property of the reaction gas. Therefore, when assembling the power generating cell stack body, one needs to stack the power generating cells while positioning a stack unit of the power generating cell stack with high accuracy.

Therefore, for example, it is conceivable to assemble a power generating cell stack body by stacking a plurality of stack units using a positioning jig disclosed in JP 2005-296746 A. The positioning jig includes a plate-like jig base and a positioning pin protruding from the jig base. A positioning hole through which a positioning pin is inserted is provided in advance in the stack unit. The positioning pin is inserted into the positioning hole, and the stack unit is dropped onto the jig base while the outer peripheral surface of the positioning pin and the inner peripheral surface of the positioning hole slide on each other. In this way, by stacking a plurality of stack units while positioning them, one can obtain a power generating cell stack body.

SUMMARY OF THE INVENTION

When the stack unit is stacked using the above-described positioning jig, a frictional force generated between the outer peripheral surface of the positioning pin and the inner peripheral surface of the positioning hole tends to increase. Accordingly, when the dropping of the stack unit along the positioning pin is inhibited, the stack unit may remain partway in the extending direction of the positioning pin. In this case, it may be difficult to obtain a power generating cell stack body by efficiently stacking the stack units on the jig base.

In order to avoid this problem, for example, clearance between the outer peripheral surface of the positioning pin and the inner peripheral surface of the positioning hole may be increased. However, in this case, even if the stack unit is dropped onto the jig base while the outer peripheral surface of the positioning pin and the inner peripheral surface of the positioning hole slide on each other, there is a concern that it is difficult to stack the plurality of stack units while positioning the plurality of stack units with high accuracy.

Therefore, it has been difficult to efficiently obtain a power generating cell stack body in which displacement between the stack units is suppressed.

An object of the present invention is to solve the above-described problems.

According to an aspect of the present invention, there is provided a method of manufacturing a power generating cell stack body by stacking on a stacking table a plurality of stack units each including an electrolyte membrane electrode assembly having electrodes disposed on both sides of an electrolyte membrane and a separator wherein the electrolyte membrane electrode assembly and the separator are stacked onto each other, the method comprising: a preparation step of preparing the stacking table provided with a vibratable stack guide portion protruding upward from the stacking table, and the stack units provided with a positioning portion guided by the stack guide portion; and a stacking step of stacking the stack units on the stacking table by causing the stack units to drop toward the stacking table while causing the stacked guide portion to slide along a positioning portion guided by the stacked guide portion that is vibrated in a vertical direction.

According to another aspect of the present invention, there is provided an apparatus for manufacturing a power generating cell stack obtained by stacking a plurality of stack units each including an electrolyte membrane-electrode assembly having electrodes disposed on both sides of an electrolyte membrane and a separator, the apparatus including: a stacking table having a stacking surface on which the stack units are stacked; a stack guide portion protruding upward from the stacking surface; and a vibration applying unit applying vibration to the stack guide portion in a vertical direction, wherein the stack units are stacked on the stacking table by causing the stack units to drop toward the stacking surface while a positioning portion provided in the stack units is arranged along the stack guide portion to which vibration is applied by the vibration applying unit.

In the present invention, the stacking unit is stacked on the stacking table by dropping the stacking unit toward the stacking table while the positioning portion of the stacking unit is stacked along the stacking guide portion. At this time, the stacking guide portion is vibrated in the vertical direction. As a result, the frictional force generated between the stack guide portion and the positioning portion can be made smaller than the static frictional force. That is, it is possible to suppress an increase in the frictional force generated between the stack guide portion and the positioning portion.

As a result, without increasing the clearance between the stack guide portion and the positioning portion of the stack unit, it is possible to prevent blockage of dropping of the stack units along the stack guide portion. That is, it is possible to efficiently stack a plurality of stack units on the stacking table while positioning them with high accuracy.

As described above, according to the present invention, it is possible to efficiently obtain a power generating cell stack body in which the misalignment between the stack units is suppressed as much as possible.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is an explanatory view illustrating a removing step of removing a plurality of stacked stack units and the stack guide portion from the stacking table.

DESCRIPTION OF THE PREFERRED EMBODIMENTS

Figure 1:
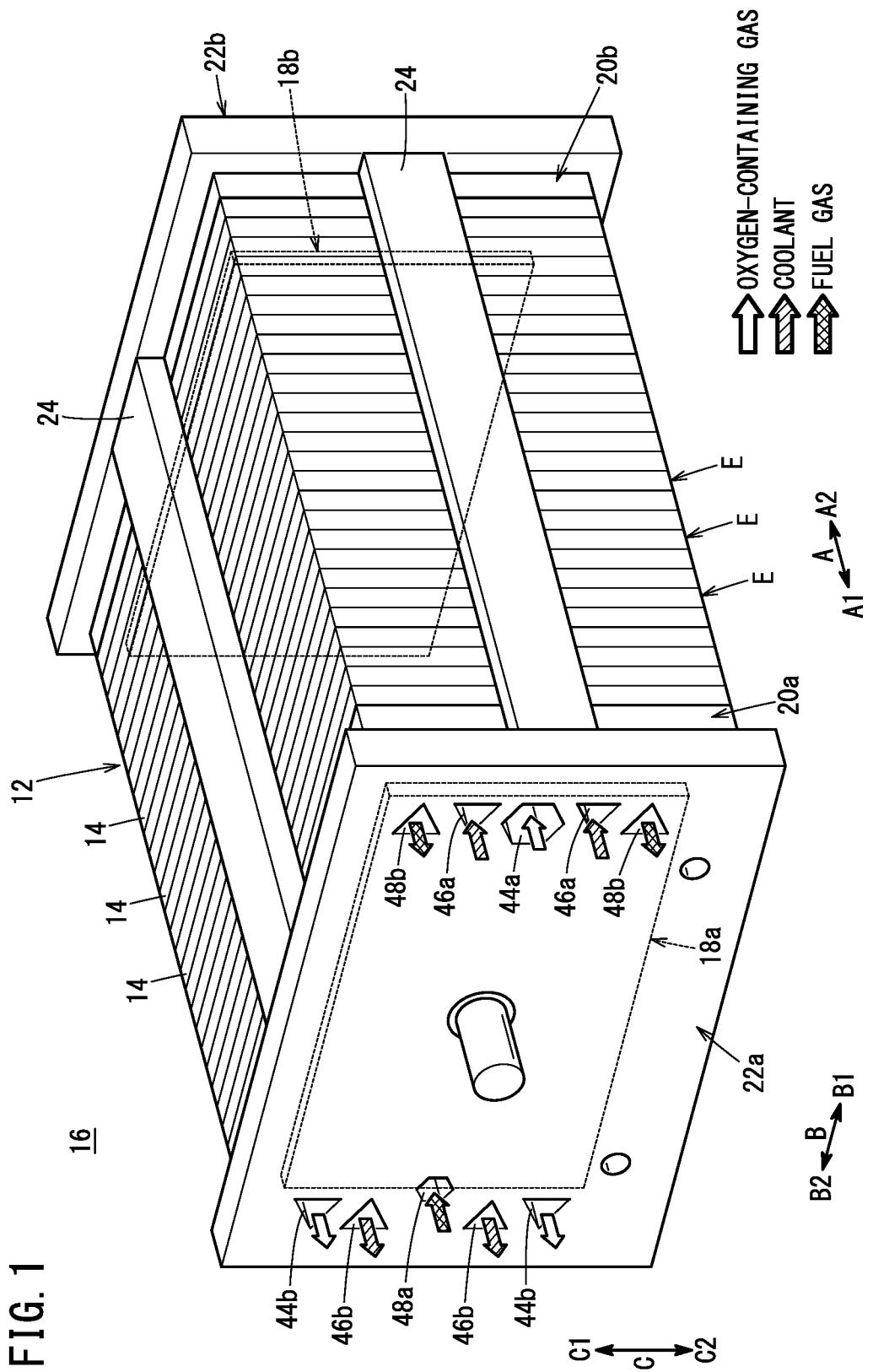
FIG. 1 is a perspective view of a power generating cell stack including a power generating cell stack body obtained by applying a method for manufacturing a power generating cell stack body according to an embodiment.

In the drawings, constituent elements that offer identical or similar functions and effects will be labeled with the same reference numerals and may not be described repeatedly.

As shown in FIG. 1, a power generating cell stack body 12 obtained by applying a method and an apparatus 10 (FIG. 8) for manufacturing a power generating cell stackbody according to the present embodiment has a plurality of power generating cells 14. The plurality of power generating cells 14 include a plurality of power generating cells 14 stacked in the stack direction (direction of an arrow A). The power generating cell stack body 12 constitutes a fuel cell stack 16. For example, the fuel cell stack 16 is stacked on a fuel cell vehicle such as a fuel cell electric vehicle (not shown).

In the fuel cell stack 16, a terminal plate 18a, an insulator 20a, and an end plate 22a are arranged outward in this order at one end (the arrow A1) in the stack direction of the power generating cell stack body 12. A terminal plate A2, a terminal plate 18b, an insulator 20b, and an end plate 22b are arranged outward in this order at the other end (an arrow A2) in the stack direction of the power generating cell stack body 12.

Connecting bars 24 are arranged between each side of the end plate 22a and each side of the end plate 22b. One end of each connecting bar 24 is fixed to the inner surface of the end plate 22a via a bolt (not shown). The other end of each connecting bar 24 is fixed to the inner surface of the end plate 22b via a bolt (not shown). Thus, a tightening load in the stack direction is applied to the power generating cell stack body 12. The fuel cell stack 16 may include a housing having the end plates 22a and 22b at ends. In this case, the power generating cell stack body 12 and so on are housed in the housing.

Figure 3:
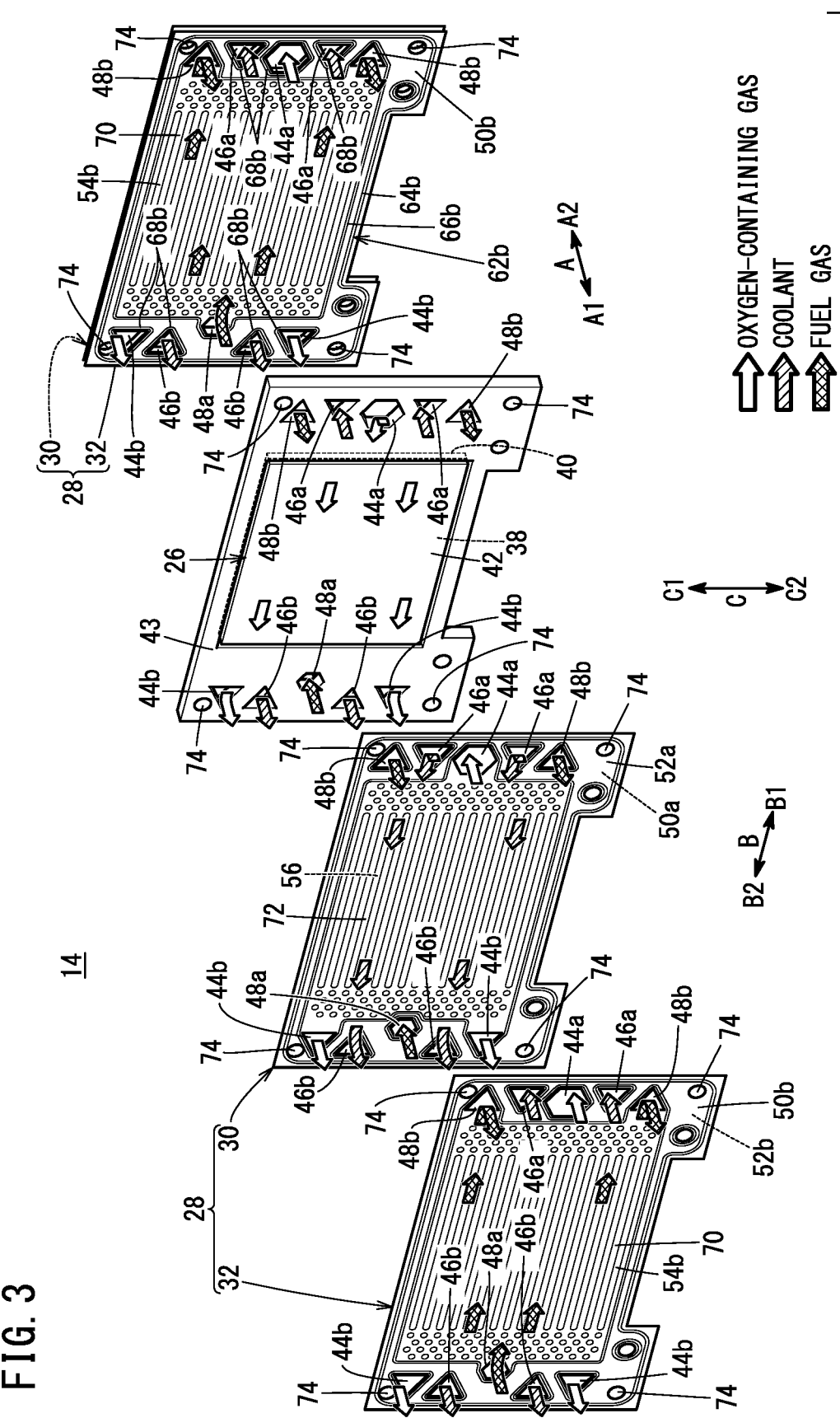
FIG. 3 is an exploded perspective view of a power generating cell.

As shown in FIG. 3, the power generating cell 14 includes a membrane electrode assembly 26 and a pair of separators 28 sandwiching the membrane electrode assembly 26. Each separator 28 has a first bipolar plate 30 and a second bipolar plate 32. Each separator 28 is formed in a manner that the outer peripheries of the stacked first bipolar plate 30 and second bipolar plate 32 are integrally joined to each other by welding, brazing, caulking, or the like. Each of the first bipolar plate 30 and the second bipolar plate 32 is formed by press forming a metal thin plate to have a corrugated shape in cross section. For example, the metal plate is a steel plate, a stainless steel plate, an aluminum plate, a plated steel plate, or a metal plate having an anti-corrosive surface by surface treatment.

It should be noted that each separator 28 is not limited to one that has structure in which the first bipolar plate 30 and the second bipolar plate 32 are joined together. Each separator 28 may be formed of a single metal plate. Each separator 28 may be formed of a single carbon plate.

The membrane electrode assembly 26 includes an electrolyte membrane 38, an anode electrode 40, and a cathode electrode 42. The anode electrode 40 is provided on one surface (surface on the arrow A2 side) of the electrolytic membrane 38. The cathode electrode 42 is provided on the other surface (the surface on the arrow A1 side) of the electrolytic membrane 38.

The electrolyte membrane 38 is a solid polymer electrolyte membrane (cation ion exchange membrane) such as a thin membrane of perfluorosulfonic acid containing water, for example. The electrolyte membrane 38 is sandwiched between the anode electrode 40 and the cathode electrode 42. A fluorine based electrolyte may be used as the electrolyte membrane 38. Alternatively, an HC (hydrocarbon) based electrolyte may be used as the electrolyte membrane 38.

Although not shown, the anode electrode 40 includes an anode electrode catalyst layer joined to one surface of the electrolyte membrane 38 and an anode gas diffusion layer stacked on the anode electrode catalyst layer. The cathode electrode 42 includes a cathode electrode catalyst layer joined to the other surface of the electrolyte membrane 38 and a cathode gas diffusion layer stacked on the cathode electrode catalyst layer.

For example, porous carbon particles with platinum alloy supported on the surface thereof are uniformly applied onto the surface of the anode gas diffusion layer together with ionic conductive polymer binder. In this way, an anode electrode catalyst layer is formed. For example, porous carbon particles with platinum alloy supported on the surface thereof are uniformly applied onto the surface of the cathode gas diffusion layer together with ionic conductive polymer binder. In this way, a cathode electrode catalyst layer is formed.

Each of the cathode gas diffusion layer and the anode gas diffusion layer is formed of a conductive porous sheet such as carbon paper or carbon cloth. A porous layer (not shown) may be provided at least one of between the cathode electrode catalyst layer and the cathode gas diffusion layer and between the anode electrode catalyst layer and the anode gas diffusion layer.

To the outer circumference of the membrane electrode assembly 26 is joined a frame-like resin frame member 43. With respect to the power generating cell 14, at an end portion of the separator 28 and the resin frame member 43 in the long-side direction (an end portion in the direction indicated by an arrow B1), are provided one oxygen-containing gas supply passage 44a, two coolant supply passages 46a, and two fuel gas discharge passages 48b. The oxygen-containing gas supply passages 44a of the stacked power generating cells 14 communicate with each other in the stack direction (the arrow A direction). The coolant supply passages 46a of the stacked power generating cells 14 communicate with each other in the stack direction (the arrow A direction). The fuel gas discharge passages 48b of the stacked power generating cells 14 communicate with each other in the stack direction (the arrow A direction).

With respect to the power generating cell 14, at another end portion of the separator 28 and the resin frame member 43 in the long-side direction (an end portion in the direction indicated by the arrow B2), are provided one fuel gas supply passage 48a, two coolant discharge passages 46b, and two oxygen-containing gas discharge passages 44b. The fuel gas supply passages 48a of the stacked power generating cells 14 communicate with each other in the stack direction (the arrow A direction). The coolant discharge passages 46b of the stacked power generating cells 14 communicate with each other in the stack direction (the arrow A direction). The oxygen-containing gas discharge passages 44b of the stacked power generating cells 14 communicate with each other in the stack direction (the arrow A direction).

An oxygen-containing gas is supplied into the oxygen-containing gas supply passage 44a. The oxygen-containing gas is an oxidizing agent. A coolant is supplied into the coolant supply passages 46a. The coolant is, for example, at least one selected from a group of pure water, ethylene glycol, and oil. The fuel gas is discharged from the fuel gas discharge passages 48b. The fuel gas is, for example, a hydrogen-containing gas. The fuel gas is supplied to the fuel gas supply passage 48a. The coolant is discharged from the coolant discharge passages 46b. The oxygen-containing gas is discharged from the oxygen-containing gas discharge passages 44b.

The oxygen-containing gas supply passage 44a extends in the stack direction through the structure of the fuel-cell stack 16 except for the terminal plates 18a and 18b (FIG. 1). The coolant supply passages 46a extend through the fuel stack 16 in the stack direction except for the terminal plates 18a and 18b (FIG. 1). The fuel gas discharge passages 48b extend through the fuel stack 16 in the stack direction except for the terminal plates 18a and 18b (FIG. 1). The fuel gas supply passage 48a extends through the fuel stack 16 in the stack direction except for the terminal plates 18a and 18b (FIG. 1). The coolant discharge passages 46b pass through the structure of the fuel-cell stack 16 in the stack direction except for the terminal plates 18a and 18b (FIG. 1). The oxygen-containing gas discharge passages 44b extend in the stack direction through the structure of the fuel-cell stack 16 except for the terminal plates 18a and 18b (FIG. 1). Hereinafter, the oxygen-containing gas supply passage 44a, the coolant supply passages 46a, the fuel gas discharge passages 48b, the fuel gas supply passage 48a, the coolant discharge passages 46b, and the oxygen-containing gas discharge passages 44b may be collectively referred to as "passages".

In the present embodiment, the passages are arranged in the vertical direction (the direction of arrow C). To be specific, two fuel gas discharge passages 48b are disposed at one end portion (one end portion in the arrow B1 direction) in the long-side direction of the power generating cell 14, separated from each other in the vertical direction. Between these two fuel gas discharge passages 48b, the two coolant supply passages 46a are arranged apart from each other in the vertical direction. Between the two coolant supply passages 46a, the oxygen-containing gas supply passage 44a is disposed.

At the other end portion (end portion in the direction of the arrow B2) in the long-side direction of the power generating cell 14, the two oxygen-containing gas discharge passages 44b are disposed, being separated from each other in the vertical direction. Between these two oxygen-containing gas discharge passages 44b, the two coolant discharge passages 46b are arranged, being vertically separated from each other. Between these two coolant discharge passages 46b, the fuel gas supply passage 48a is arranged.

Note that the passages are not limited to the above-described arrangement and can be appropriately set so as to be arranged according to required specifications. In this embodiment, the two fuel gas discharge passages 48b, the two oxygen-containing gas discharge passages 44b, the two coolant supply passages 46a, and the two coolant discharge passages 46b are provided. Instead, one passage 48a, one passage 44b, one passage 46a, and one passage 46b may be provided.

In the present embodiment, each of the oxygen-containing gas supply passage 44a and the fuel gas supply passage 48a has a hexagonal shape, for example, but the shape is not limited thereto. Each of the oxygen-containing gas supply passage 44a and the fuel gas supply passage 48a may have a shape other than a hexagonal shape (e.g., a rectangular shape).

Each of the oxygen-containing gas discharge passages 44b, each of the fuel gas discharge passages 48b, each of the coolant supply passages 46a, and each of the coolant discharge passages 46b are triangular-shaped but the shape is not limited thereto. Each of the oxygen-containing gas discharge passages 44b, each of the fuel gas discharge passages 48b, each of the coolant supply passages 46a, and each of the coolant discharge passages 46b may have, for example, a triangular shape with rounded corners or a triangular shape with linearly chamfered corners (substantially a hexagonal shape).

The first bipolar plate 30 and the second bipolar plate 32 are incorporated into the stack body 20 as separators 36. Each first bipolar plate 30 has an MEA side surface 50a and a refrigerant side surface 52a which is a back surface with respect to the MEA side surface 50a. Each second bipolar plate 32 has an MEA side surface 50b and a refrigerant side surface 52b which is the back surface with respect to the MEA side surface 50b. Each of the MEA side surfaces 50a and 50b faces toward the membrane electrode assembly 26.

Figure 4:
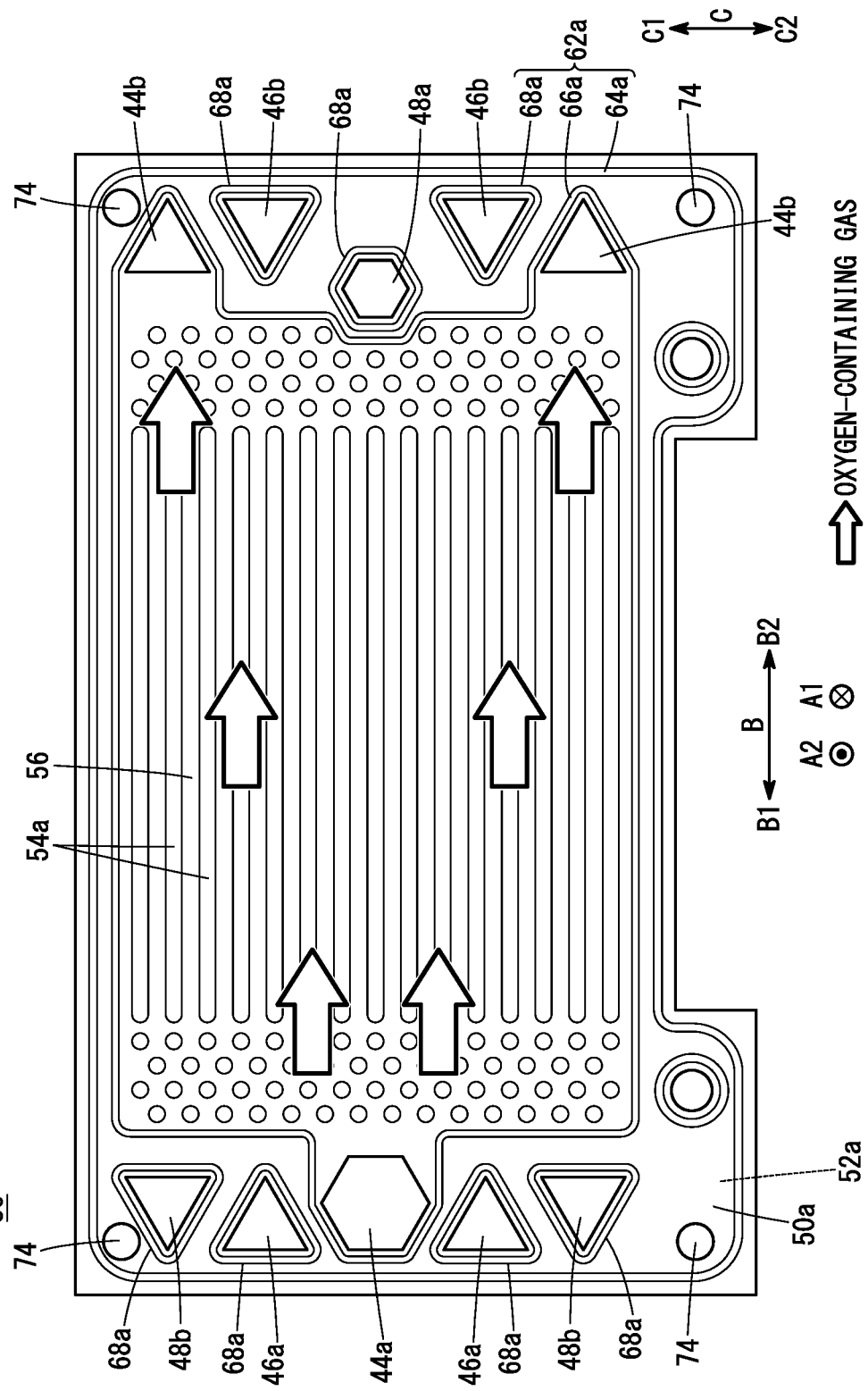
FIG. 4 is a front view of a surface of a separator (first bipolar plate) where an oxygen-containing gas channel is provided.

As shown in FIG. 4, the MEA side surface 50a of the first bipolar plate 30 is provided with a plurality of protrusions 54a extending linearly in the direction of the arrow B. A plurality of linear grooves are formed between the protrusions 54a. The plurality of grooves constitute an oxygen-containing gas channel 56. Each protrusion 54a and each groove may be wavy. The oxygen-containing gas channel 56 fluidly communicates with one oxygen-containing gas supply passage 44a and two oxygen-containing gas discharge passages 44b to allow the oxygen-containing gas to flow in the surface direction of the separator 28 (the direction indicated by the arrow B or the direction indicated by the arrow C).

A plurality of metal bead seals 62a are integrally provided on the MEA side surface 50a of the first bipolar plate 30. Each metal bead seal 62a protrudes toward the membrane electrode assembly 26 (FIG. 3). Each metal bead seal 62a is provided by, for example, press molding. Instead of the metal bead seals 62a, convex elastic seals made of an elastic material such as rubber may be provided on the MEA side surface 50a.

The plurality of metal bead seals 62a include an outer bead portion 64a, an inner bead portion 66a, and a plurality of passage bead portions 68a. The outer bead portion 64a is provided on the outer peripheral portion of the MEA side surface 50a. The inner bead portion 66a surrounds the oxygen-containing gas channel 56, the oxygen-containing gas supply passage 44a, and the two oxygen-containing gas discharge passages 44b. The oxygen-containing gas channel 56, the oxygen-containing gas supply passage 44a, and the two oxygen-containing gas discharge passages 44b are surrounded by the inner bead portion 66a in a mutually communicating state.

The plurality of passage bead portions 68a surround, respectively, the fuel gas supply passage 48a, each fuel gas discharge passage 48b, each coolant supply passage 46a, and each coolant discharge passage 46b. The outer bead portion 64a is provided depending on the necessity thereof and can be omitted.

Figure 2:
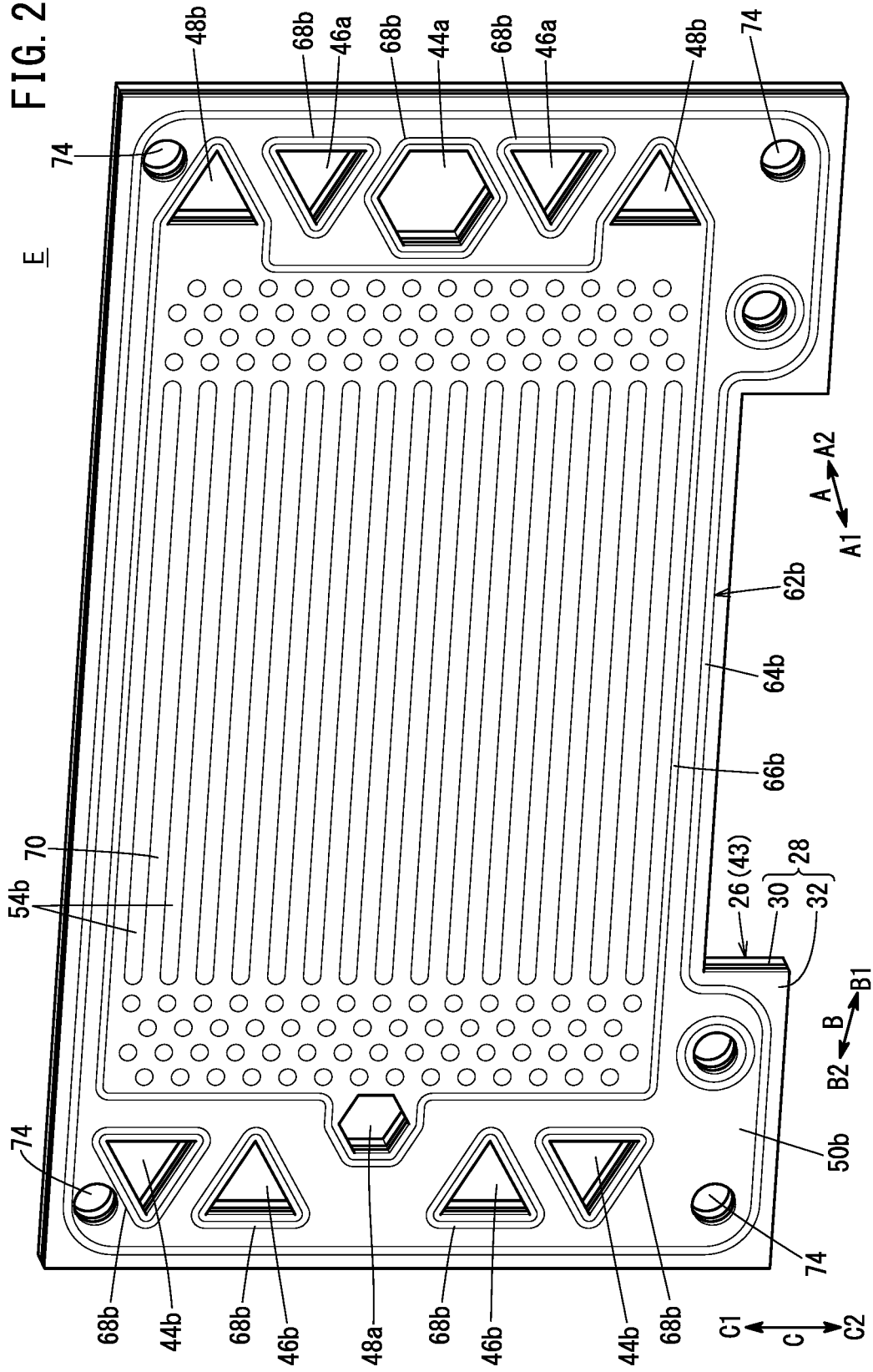
FIG. 2 is a perspective view of a stack unit.

As shown in FIGS. 2 and 3, the MEA side surface 50b of the second bipolar plate 32 is provided with a plurality of protrusions 54b extending linearly in the direction of the arrow B. A plurality of linear grooves are formed between the protrusions 54b. The plurality of grooves constitute a fuel gas channel 70. Each protrusion 54b and each groove may be wavy. The fuel gas channel 70 fluidly communicates with one fuel gas supply passage 48a and two fuel gas discharge passages 48b, thereby allowing the fuel gas to flow in the surface direction of the separator 28 (the arrow B direction and the arrow C direction).

On the MEA side surface 50b of the second bipolar plate 32, a plurality of metal bead seals 62b are integrally provided. Each metal bead seal 62b protrudes toward the membrane electrode assembly 26 (FIG. 3). Each metal bead seal 62b is provided by, for example, press molding. Instead of the metal bead seals 62b, convex elastic seals made of an elastic material such as rubber may be provided. The plurality of metal bead seals 62b include an outer bead portion 64b, an inner bead portion 66b, and a plurality of passage bead portions 68b. The outer bead portion 64b is provided on the outer peripheral portion of the MEA side surface 50b. The inner bead portion 66b surrounds the fuel gas channel 70, the fuel gas supply passage 48a, and the two fuel gas discharge passages 48b. The fuel gas channel 70, the fuel gas supply passage 48a, and the two fuel gas discharge passages 48b are surrounded by the inner bead portion 66b in a mutually communicating state.

The plurality of passage bead portions 68b surround, respectively, the oxygen-containing gas supply passage 44a, each oxygen-containing gas discharge passage 44b, each coolant supply passage 46a, and each coolant discharge passage 46b. The outer bead portion 64b may be provided depending on the necessity thereof and can be omitted.

As shown in FIG. 3, the refrigerant side surface 52a of the first bipolar plate 30 and the refrigerant side surface 52b of the second bipolar plate 32 are joined to each other. A coolant channel 72 is provided between the refrigerant side surface 52a and the refrigerant side surface 52b. The coolant channel 72 allows the coolant to flow in the surface direction (the arrow B direction, the arrow C direction) of the separator 28. The coolant channel 72 fluidly connects the two coolant supply passages 46a and the two coolant discharge passages 46b.

The back surface of the oxygen-containing gas channel 56 of the first bipolar plate 30 and the back surface of the fuel gas channel 70 of the second bipolar plate 32 overlap each other to form the coolant channel 72. On the refrigerant side surfaces 52a, 52b of the first bipolar plate 30 and the second bipolar plate 32 facing each other, the periphery of the passages of the first bipolar plate 30 and the periphery of the passages of the second bipolar plate 32 are joined to each other by welding, brazing, or the like.

Figure 5:
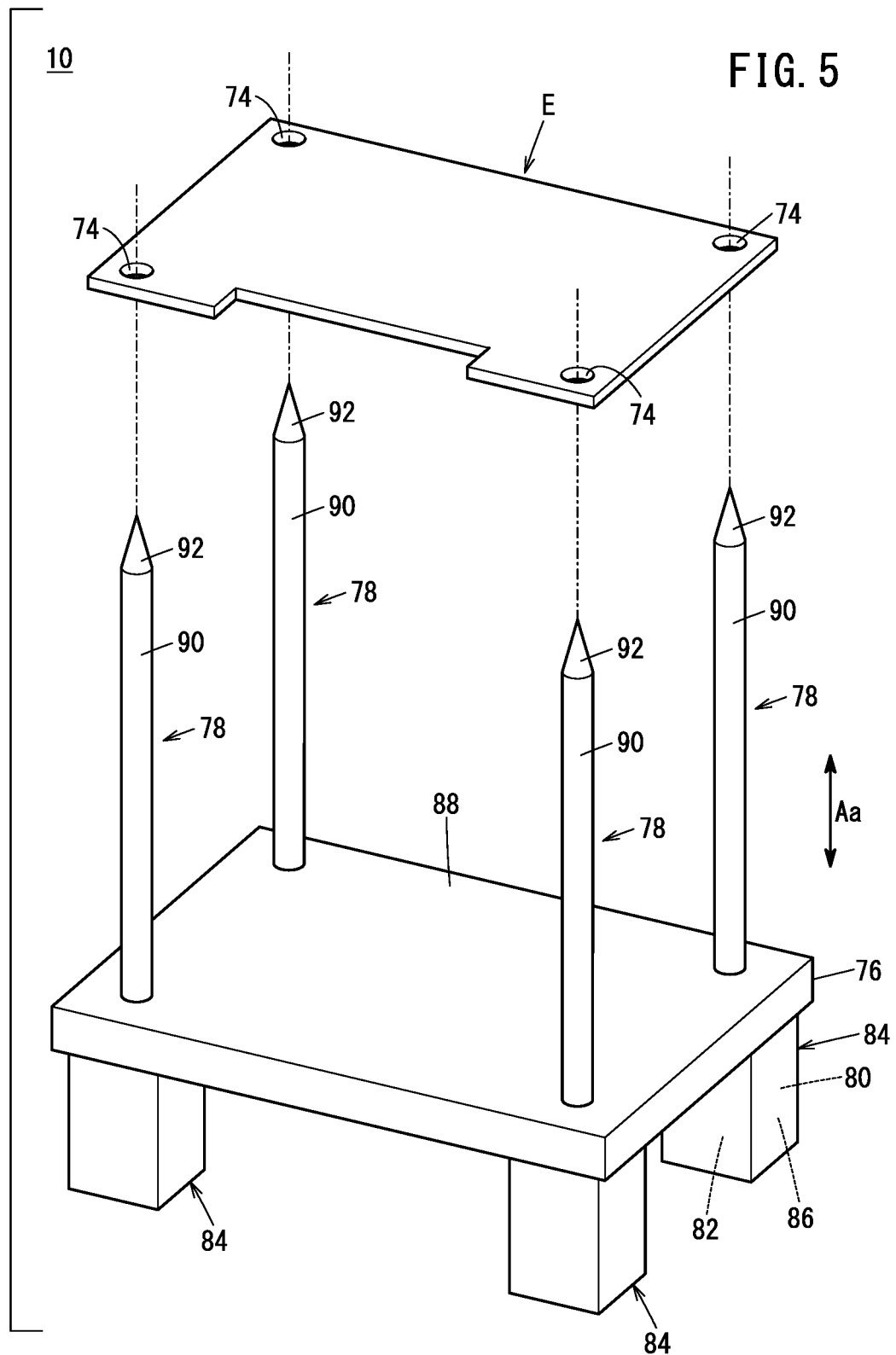
FIG. 5 is a schematic perspective view of an apparatus for manufacturing a power generating cell stack body according to an embodiment.

A manufacturing apparatus 10 for the power generating cell stack body 12 according to the present embodiment (hereinafter also simply referred to as a manufacturing apparatus 10) will be described mainly with reference to FIGS. 5 to 8. Hereinafter, an example will be described in which the manufacturing apparatus 10 stack a plurality of stack units E (FIG. 2) in which one separator 28 and one membrane electrode assembly 26 are stacked and joined together, thereby obtaining the power generating cell stack body 12 (FIG. 1). In FIG. 5, the stack unit E is schematically illustrated without showing the passages, the fuel gas channel 70, and the like.

However, the stack unit E is not limited to a structure in which one separator 28 and one membrane electrode assembly 26 are stacked and joined together. The stack unit E may be any unit as long as the power generating cell stack body 12 can be finally formed by stacking a plurality of units.

As shown in FIG. 2, a positioning portion 74 is provided in advance in each stack unit E. When a plurality of stack units E are stacked, the positioning portions 74 of the respective stack units E are overlapped in the vertical direction, whereby the stack units E are accurately positioned with respect to each other.

In the present embodiment, the positioning portion 74 is an insertion hole that penetrates the stack unit E in the stack direction. The insertion hole has a circular shape when viewed in the stack direction. Instead of the insertion hole, the positioning portion 74 may be, for example, an insertion groove (not shown) having a shape obtained by cutting out an edge portion of the stack unit E from the outside to the inside.

Further, in the present embodiment, the positioning portions 74 are disposed at the four corners of stack unit E. That is, a total of four positioning portions 74 are provided in each stack unit E. However, the arrangement and the number of the positioning portions 74 provided for the stack unit E are not limited to the foregoing example. The arrangement and the number of the positioning portions 74 provided for the stack unit E can be variously set according to, for example, the shapes of the separators 28, the membrane electrode assemblies 26, and the resin frame members 43. It is preferable that the positioning portions 74 be arranged so as to avoid the metal bead seals 62a, 62b.

Figure 6:
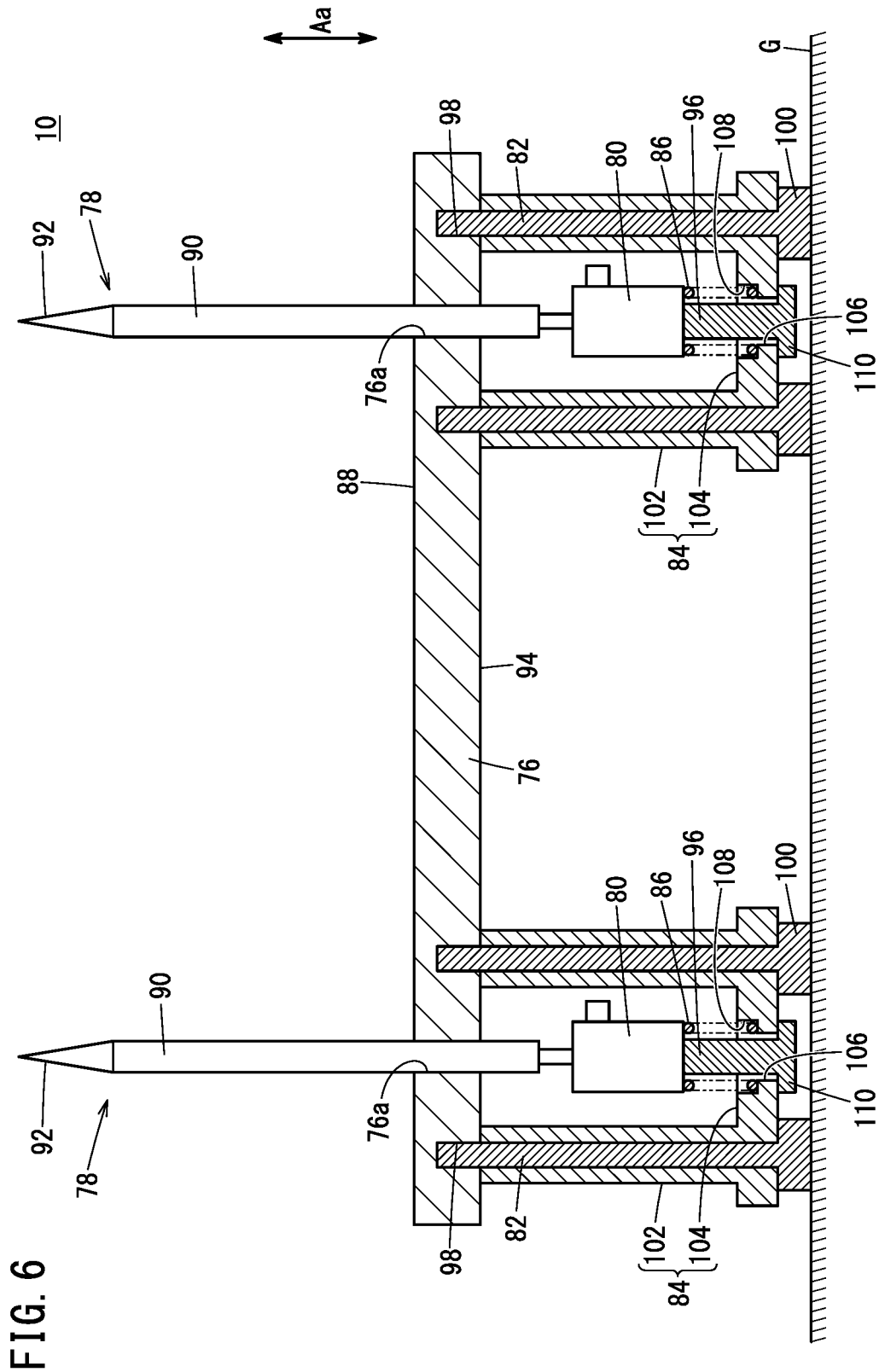
FIG. 6 is a cross-sectional view of a manufacturing apparatus shown in FIG. 5.

As shown in FIGS. 5 and 6, the manufacturing apparatus 10 includes a stacking table 76, column members 78, vibration applying units 80, table support members 82, floating support portions 84, and elastic members 86. The stacking table 76 has a stacking surface 88. The stack units E are stacked on the stacking surface 88 in the vertical direction (the direction of the arrow Aa). That is, the stack direction of the stack units E is the vertical direction in relation to the manufacturing apparatus 10. The stacking table 76 has a plate shape with a predetermined thickness. A stacking surface 88 is provided on the upper surface of the stacking table 76. In the present embodiment, the outer dimension of the placement surface 88 as viewed in the vertical direction is a rectangular shape that is larger than the outer dimension of the stack unit E as viewed in the stack direction, but is not particularly limited thereto.

Each column member 78 has a bar shape penetrating the stacking table 76 in the vertical direction. To be specific, as shown in FIG. 6, each column member 78 is inserted through a through hole 76a provided in the stacking table 76 along the vertical direction. As shown in FIG. 5, each column member 78 is provided at a position corresponding to the positioning portion 74 of the stack unit E stacked on the placement surface 88. In the present embodiment, as described above, the four column members 78 are provided at the four corners of the placement surface 88 in accordance with the four positioning portions 74 provided at the four corners of the stack unit E.

A portion of each column member 78 projecting upward from the stacking surface 88 constitutes a stack guide portion 90. That is, the stack guide portion 90 has a bar shape protruding upward from the placement surface 88. The stack guide portion 90 has a cylindrical shape that can be inserted into the positioning portion 74 of the stack unit E when the stack unit E is stacked on the stacking surface 88. A reduced-diameter portion 92 is provided at an upper end portion of the stack guide portion 90. The reduced-diameter portion 92 has a tapered shape whose diameter decreases upward.

Figure 7:
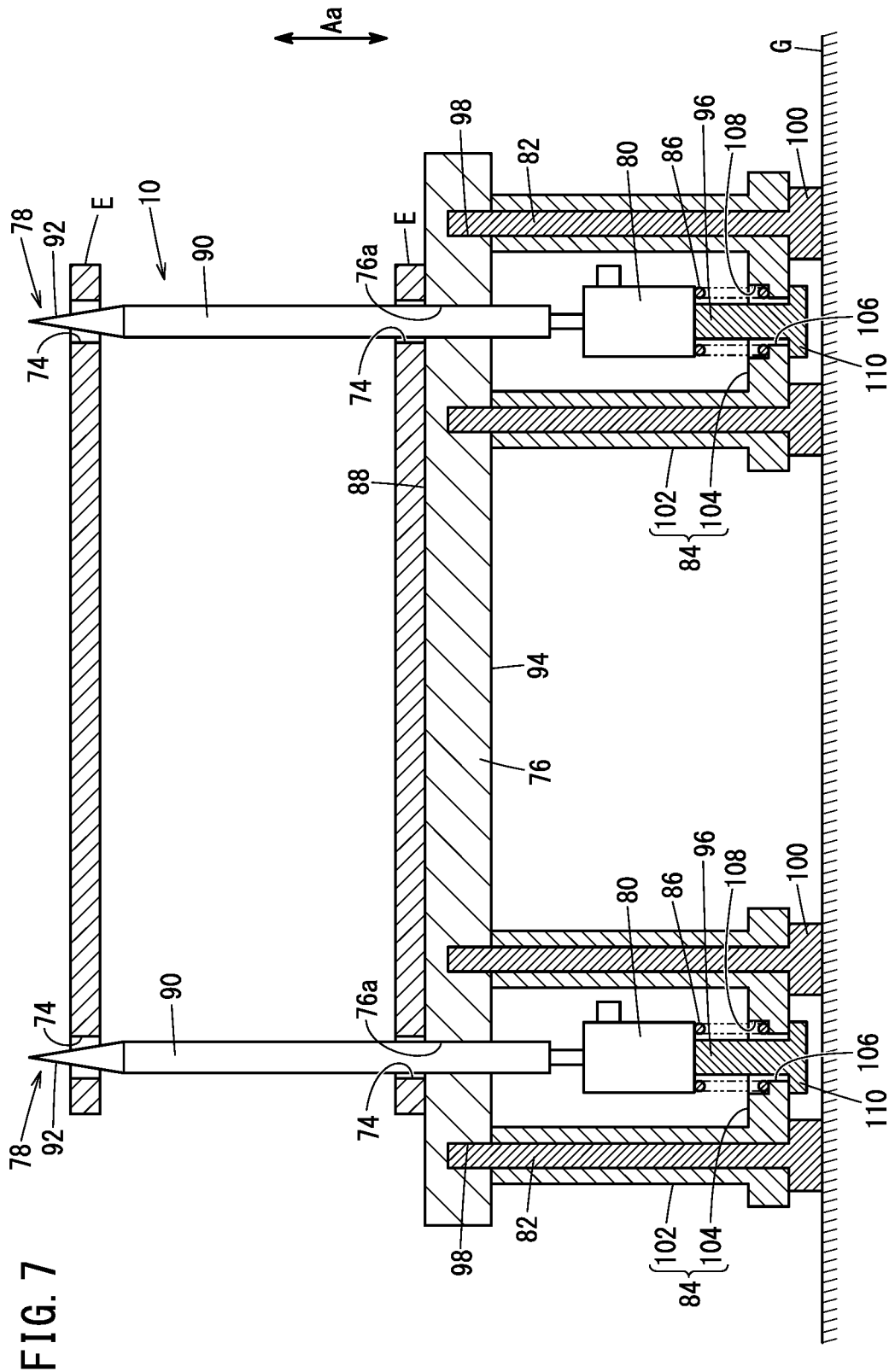
FIG. 7 is an explanatory diagram that explains a stacking step in which a stack unit is stacked on a stacking table shown in FIG. 6.
Figure 8:
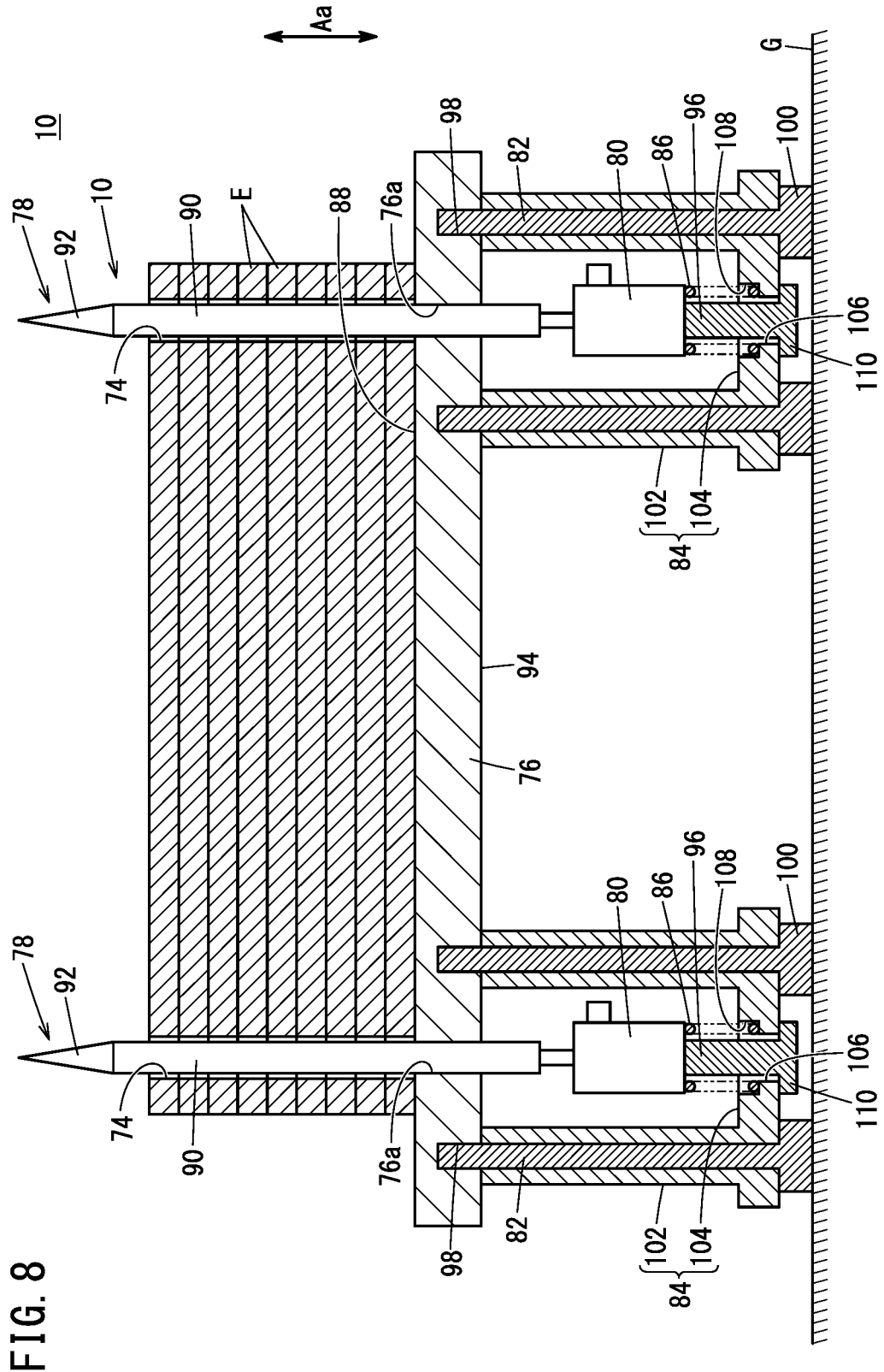
FIG. 8 is a further explanatory diagram that explains the stacking step.

The diameter of the reduced-diameter portion 92 of the stack guide portion 90 is smaller than the diameter of the positioning portion 74. The diameter of the portion of the stack guide portion 90 below the reduced-diameter portion 92 is slightly smaller than the diameter of the positioning portion 74. Therefore, as shown in FIGS. 7 and 8, by inserting each stack guide portion 90 into each positioning portion 74, it is possible to cause each of the plurality of stack units E to drop toward the placement surface 88 while the positioning portion 74 is caused to follow the stack guide portion 90. As a result, the plurality of stack units E are stacked on the stacking surface 88 in a state of being positioned relative to each other.

As shown in FIG. 6, a portion of each column member 78 below the stack guide portion 90 protrudes downward from the back surface 94 of the stacking surface 88. The lower end portion of each column member 78 is connected to the vibration applying unit 80. In the present embodiment, the lower end portion of each column member 78 is attachable to and detachable from the vibration applying unit 80. Each column member 78 is also attachable to and detachable from the stacking table 76 via the through hole 76a.

That is, for example, the lower end portion of the column member 78 is attached to the vibration applying unit 80 in a state of being inserted through the through hole 76a of the stacking table 76. Thus, the column member 78 can be stacked on the manufacturing apparatus 10 such that the stack guide portion 90 protrudes upward from the stacking surface 88. In addition, for example, the lower end portion of the column member 78 removed from the vibration applying unit 80 is pulled out from the through hole 76a of the stacking table 76. As a result, the column member 78 (stack guide portion 90) can be removed from the manufacturing apparatus 10.

The vibration applying unit 80 applies vertical vibration to the stack guide portion 90 via the lower end of the column member 78 attached to the vibration applying unit 80. The vibration applying unit 80 is, for example, a vibrator that applies mechanical vibration to the stack guide portion 90. The vibration applying unit 80 can change at least one of an amplitude and a frequency of vibration (hereinafter, also simply referred to as "magnitude of vibration") applied to the stack guide portion 90, for example, under the control of a control unit (not illustrated). A vibration guide unit 96 is provided at a lower portion of the vibration applying unit 80. The vibration guide unit 96 extends in the vertical direction.

Each table support member 82 protrudes downward from the back surface 94 of the stacking table 76 in the vicinity of the column member 78. Thus, the table support members 82 support the stacking table 76 that is being separated from the floor surface G or the like. That is, in the present embodiment, the stacking table 76 is supported by a total of four table support members 82 disposed at the four corners of the back surface 94. Each base support portion 82 has a substantially rectangular tubular shape that surrounds the lower end portion of the column member 78 and the vibration applying unit 80 on the inner side, but is not particularly limited thereto. Each table support member 82 can have various shapes that are capable of supporting the stacking table 76. An upper end portion of each table support member 82 is fitted into a groove portion 98 provided on the back surface 94 of the stacking table 76. A wide portion 100 along the floor surface G is provided at a lower end portion of the table support member 82.

A floating support portion 84 is provided between the back surface 94 of the stacking table 76 and the wide portions 100 of the table support members 82. In the present embodiment, the floating support portion 84 includes a hollow main body portion 102 and a bottom portion 104 provided at a lower end portion of the main body portion 102. The bottom portion 104 extends parallel to the back surface 94. The table support member 82 is fitted into the main body portion 102, thereby being reinforced.

The bottom portion 104 is disposed below the vibration applying unit 80. The bottom portion 104 has a portion facing the vibration applying unit 80 with a gap therebetween. An elastic member 86 is disposed between the bottom portion 104 and the vibration applying unit 80. In this way, the floating support portion 84 supports the vibration applying unit 80 in a floating manner via the elastic member 86.

Specifically, a vibration guide hole 106 is formed through the bottom portion 104 in the vertical direction. In the present embodiment, the elastic member 86 is a coil spring, and the direction of expansion and contraction thereof is the vertical direction. A lower end portion of the elastic member 86 is inserted into the receiving groove 108. The receiving groove 108 is provided in a peripheral portion of the vibration guide hole 106 of the bottom portion 104. Therefore, the elastic member 86 can be elastically deformed in the vertical direction between the periphery of the vibration guide hole 106 of the bottom portion 104 and the vibration applying unit 80.

The vibration guide unit 96 is inserted through the inner side of the elastic member 86 and the vibration guide hole 106. The diameter of the vibration guide hole 106 is set to be slightly larger than the diameter of the vibration guide unit 96. Thus, the vibration guide unit 96 is movable along the vertical direction inside the vibration guide hole 106. A stopper 110 having a larger diameter than the vibration guide hole 106 is provided at the lower end of the vibration guide unit 96 projecting downward from the vibration guide hole 106.

As described above, since the vibration applying unit 80 is supported in a floating manner, the vibration applying unit 80 can favorably apply vertical vibrations to the stack guide portion 90. It should be noted that vibrations given by the vibration applying unit 80 to the stack guide portion 90 may include vibrations in a direction other than the vertical direction.

The manufacturing apparatus 10 is basically configured as described above. Hereinafter, a method of manufacturing the power generating cell stack body 12 according to the present embodiment will be described by taking, as an example, a case where the power generating cell stack body 12 of FIG. 1 is obtained by stacking a plurality of stack units E of FIG. 2 with the manufacturing apparatus 10 of FIGS. 5-8.

In the method for manufacturing the power generating cell stack body 12, first, a preparation step is performed. As described above, in the manufacturing apparatus 10, the column member 78 is attachable to and detachable from the vibration applying unit 80 and the stacking table 76. Therefore, in the preparation step, the lower end portion of the column member 78 is inserted into the through hole 76a of the stacking table 76 and attached to the vibration applying unit 80. As a result, it is possible to prepare the stacking table 76 (FIGS. 5 and 6) that is in a state in which the stack guide portions 90 that can vibrate are protruding upward from the stacking surface 88. Further, in the preparation step, the stack unit E (FIG. 2) provided with the positioning portions 74 guided by the stack guide portions 90 is further prepared.

Next, a placing step is performed. In the placing step, the vibration applying unit 80 applies vibrations to the stack guide portion 90 in the vertical direction. As shown in FIGS. 5 and 7, the positioning portions 74 of the stack unit E is inserted into the stack guide portions 90 that have thus been vibrated. As described above, the reduced-diameter portion 92 is provided at the upper end portion of the stack guide portion 90. The stack guide portion 90 can be easily inserted into the positioning portion 74 via the reduced-diameter portion 92.

The stack unit E is stacked on the stacking table 76 by dropping the stack unit E toward the stacking table 76 while the inner peripheral surface of the positioning portion 74 is kept parallel to the outer peripheral surface of the stack guide portion 90. At this time, since the vibration is applied to the stack guide portion 90 as described above, the frictional force generated between the outer peripheral surface of the stack guide portion 90 and the inner peripheral surface of the positioning portion 74 is the dynamic frictional force.

In the placing step, the magnitude of the vibration applied to the stack guide portion 90 can be set in accordance with, for example, the clearance between the outer peripheral surface of the stack guide portion 90 and the inner peripheral surface of the positioning portion 74. In the placing step, the magnitude of the vibration applied to the stack guide portion 90 can be set according to, for example, the size and weight of the stack unit E. The smaller the clearance between the outer peripheral surface of the stack guide portion 90 and the inner peripheral surface of the positioning portion 74 is, the easier it is for the outer peripheral surface of the stack guide portion 90 and the inner peripheral surface of the positioning portion 74 to come into contact with each other. Therefore, for example, the vibration applied to the stack guide portion 90 may be increased as the clearance is decreased.

By repeating this placing step, a plurality of stack units E are stacked on the stacking table 76. At this time, the magnitude of the vibration applied to the stack guide portion 90 is changed in accordance with the number of stack units E stacked on the stacking table 76. For example, as illustrated in FIG. 8, as the number of stack units E with the positioning portion 74 being inserted into the stack guide portion 90 increases, the vibration applied from the lower end portion of the stack guide portion 90 by the vibration applying unit 80 tends to be less likely to be transmitted to the upper portion of the stack guide portion 90.

Therefore, for example, when the number of stacking units E stacked on the stacking table 76 exceeds a predetermined value, the magnitude of the vibration applied to the stack guide portion 90 by the vibration applying unit 80 is increased. Thus, regardless of the number of stack units E stacked on the stacking table 76, the stack guide portion 90 can be maintained in a state in which the stack guide portion 90 is satisfactorily vibrated up to the upper end portion thereof.

The timing of changing the magnitude of the vibration applied to the stack guide portion 90 is not limited to the case where the number of stack units E stacked on the stacking table 76 exceeds the predetermined value as described above. For example, the magnitude of the vibration applied to the stack guide portion 90 may be continuously increased as the number of stack units E stacked on the stacking table 76 increases.

The timing of changing the magnitude of the vibration applied to the stack guide portion 90 may be determined by counting the number of stack units E stacked on the stacking table 76. The above timing may be determined by measuring the weight of the stack units E on the stacking table 76. The above-described timing may be determined according to the height of the stack units E in the vertical direction on the stacking table 76. The above-described timing may be determined in accordance with the elapsed time from the start of the stacking of the stack units E on the stacking table 76.

The placing step is performed until the number of stack units E stacked on the stacking table 76 as described above reaches the total number required to form the power generating cell stack body 12. As a result, a predetermined number of stack units E are stacked on the stacking table 76 in a state in which the stack units E are positioned relative to each other. In the placing step, all the stack units E may be stacked on the stacking table 76 without changing the magnitude of the vibration applied to the stack guide portion 90. In this case, for example, the magnitude of the vibration applied to the stack guide portion 90 may be set in advance so that the entire stack guide portion 90 can be maintained in a favorably vibrated state until all the stack units E are completely stacked on the stacking table 76.

Next, a removing step is performed. As described above, the plurality of stack units E are stacked on the stacking table 76 according to the stacking step. The plurality of stack units E are in a state where the stack guide portions 90 have been inserted into the positioning portions 74 of each stack unit E. As shown in FIG. 9, in the removing step, the plurality of stack units E are removed from the stacking table 76 together with the stack guide portions 90 (column members 78).

After the removing step, for example, portions of the stack guide portions 90 protruding from both ends in the stack direction of the plurality of stack units E are removed as required. As a result, the power generating cell stack body 12 is obtained. That is, in the present embodiment, the stack guide portion 90 also has a function as a support member that supports the plurality of stack units E in a state in which the plurality of stack units E are positioned and stacked as described above. In FIGS. 2 to 4, illustration of the stack guide portion 90 has been omitted.

The operation of the fuel cell stack 16 including the power generating cell stack body 12 will be briefly described below. As shown in FIGS. 1 and 3, when the fuel cell stack 16 generates electric power, fuel gas is supplied to the fuel gas supply passage 48a. Oxygen-containing gas is supplied to the oxygen-containing gas supply passage 44a. The coolant is supplied to the coolant supply passages 46a.

As shown in FIG. 3, the oxygen-containing gas is introduced into the oxygen-containing gas channel 56 from the oxygen-containing gas supply passage 44a. The oxygen-containing gas flows along the oxygen-containing gas channel 56 in the direction indicated by the arrow B and is supplied to the cathode electrode 42 of the membrane electrode assembly 26. On the other hand, as shown in FIG. 4, the fuel gas is introduced into the fuel gas channel 70 from the fuel gas supply passage 48a. The fuel gas is supplied to the anode electrode 40 of the membrane electrode assembly 26 while moving along the fuel gas channel 70 in the direction indicated by the arrow B.

Therefore, as shown in FIG. 3, in each of the membrane electrode assemblies 26, the oxygen-containing gas and the fuel gas are consumed by electrochemical reactions in the cathode catalyst layer and the anode catalyst layer to generate electricity.

The oxygen-containing gas (oxygen-containing exhaust gas) that has not been consumed in the electrochemical reaction flows from the oxygen-containing gas channel 56 into the oxygen-containing gas discharge passages 44b. The oxygen-containing gas flows through the oxygen-containing gas discharge passages 44b in the direction indicated by the arrow A and is discharged from the fuel cell stack 16. Similarly, the fuel gas (fuel exhaust gas) that has not been consumed in the electrochemical reaction flows into the fuel gas discharge passages 48b from the fuel gas channel 70. The fuel gas flows through the fuel gas discharge passages 48b in the direction indicated by the arrow A and is discharged from the fuel cell stack 16.

The coolant is introduced into the coolant channel 72 from the coolant supply passages 46a. The coolant exchanges heat with the membrane electrode assembly 26 while moving along the coolant channel 72 in the direction indicated by the arrow B. The heat-exchanged coolant flows into the coolant discharge passages 46b. The coolant flows through the coolant discharge passages 46b in the direction of arrow A and is discharged from the fuel cell stack 16.

As described above, according to the method and the apparatus 10 for manufacturing the power generating cell stack body 12 of the present embodiment, the stack unit E is dropped toward the stacking table 76 while the positioning portion 74 of the stack unit E is kept parallel to the stack guide portion 90. In this way, the stack unit E is stacked on the stacking table 76. At this time, the stack guide portion 90 is vibrated in the vertical direction. Thus, the frictional force generated between the stack guide portion 90 and the positioning portion 74 can be made smaller than the static frictional force. That is, it is possible to suppress an increase in the frictional force generated between the stack guide portion 90 and the positioning portion 74.

As a result, the stack unit E can be smoothly dropped along the stack guide portion 90 without increasing the clearance between the stack guide portion 90 and the positioning portion 74 of the stack unit E. Therefore, it is possible to efficiently stack the plurality of stack units E on the stacking table 76 while positioning the plurality of stack units E with high accuracy.

Further, with respect to the manufacturing apparatus 10, for example, even in a case where a coating or the like for reducing friction is not provided on the stack guide portion 90 or the positioning portion 74, the stack unit E can be smoothly dropped along the stack guide portion 90. An example of the friction-reducing coating is a fluororesin coating such as polytetrafluoroethylene. In this way, coating or the like for reducing friction can be made unnecessary, and therefore an increase in cost required for manufacturing the power generating cell stack body 12 can be suppressed.

Therefore, it is possible to obtain the power generating cell stack body 12 efficiently and at low cost in which misalignment between the stack units E is suppressed as much as possible.

In the method of manufacturing the power generating cell stack body 12 according to the above embodiment, the stack guide portion 90 has a rod shape protruding upward from the stacking table 76, the positioning portion 74 is an insertion hole or an insertion groove into which the stack guide portion 90 is inserted, and in the stacking step, while the stack guide portion 90 that has been vibrated is inserted into the positioning portion 74, the stack unit E is dropped and stacked on the stacking table 76. With respect to the apparatus 10 for manufacturing the power generating cell stack body 12 according to the above embodiment, the stack guide portion 90 has a rod shape that can be inserted into the positioning portion 74 that is an insertion hole or an insertion groove provided in the stack unit E.

In these cases, it is possible to easily stack the plurality of stack units E while the plurality of stack units E are positioned with high accuracy by a simple configuration in which the stack guide portion 90 is formed in a rod shape and the positioning portion 74 is formed as an insertion hole or an insertion groove.

Although not shown, the stack guide portion 90 may have a plate shape protruding upward from the stacking table 76. In addition, in this case, the stack unit E is dropped toward the stacking table 76 while the side surface of the stack guide portion 90 and the positioning portion 74 which is the side surface of the stack unit E are caused to move (slide) along each other. In this way, the stack unit E is stacked on the stacking table 76. The arrangement of the plate-like stack guide portion 90 and the shape thereof as viewed in the vertical direction are not particularly limited. For example, the plate-like stack guide portion 90 may have a frame shape integrally surrounding the outer periphery of the stack unit E when viewed in the vertical direction. For example, when viewed in the vertical direction, the plate-like stack guide portion 90 may have a bent shape surrounding only the four corners of the stack unit E.

The method of manufacturing the power generating cell stack body 12 according to the above-described embodiment includes a removing step in which after the plurality of stack units E are stacked on the stacking table 76 in the stacking step, the plurality of stack units E are removed from the stacking table 76 together with the stack guide portions 90, the plurality of stack units E being in a state where the stack guide portions 90 have been inserted into the positioning portions 74.

In addition, in the manufacturing apparatus 10 of the power generating cell stack body 12 according to the above-described embodiment, the stack guide portions 90 can be removed from the stacking table 76 together with the plurality of stack units E, the stack guide portions 90 being in a state of having been inserted into the positioning portions 74 of the plurality of stacking units E stacked on the stacking table 76.

In these cases, since the stack guide portions 90 function as a support member, the plurality of stack units E can be easily handled while being maintained in a state of being positioned with high accuracy as described above.

However, in the removing step, only the plurality of stack units E stacked on the stacking table 76 may be removed from the stacking table 76. That is, the plurality of stack units E may be removed from the stacking table 76 and the stack guide portions 90 while the stack guide portions 90 are fixed with respect to the stacking table 76. In this case, regarding the manufacturing apparatus 10, the column member 78 (the stack guide portion 90) may be provided in a state of being always fixed with respect to the vibration applying unit 80 and the stacking table 76, instead of being attachable to and detachable from the vibration applying unit 80 and the stacking table 76.

In the placing step of the method for manufacturing the power generating cell stack body 12 according to the above embodiment, at least one of the frequency and the amplitude of the vibration applied to the stack guide portion 90 is changed in accordance with the number of stack units E stacked on the stacking table 76. Regarding the apparatus 10 for manufacturing the power generating cell stack body 12 according to the above embodiment, the vibration applying unit 80 changes at least one of the frequency and the amplitude of the vibration applied to the stack guide portion 90 in accordance with the number of stack units E stacked on the stacking table 76.

In these cases, as described above, it is possible to maintain a state in which the stack guide portion 90 is satisfactorily vibrated up to the upper end portion regardless of the number of stack units E stacked on the stacking table 76. Accordingly, the frictional force generated between the stack guide portion 90 and the positioning portion 74 can be maintained at the dynamic frictional force. Consequently, it is possible to obtain the power generating cell stack body 12 by efficiently stacking the plurality of stack units E in a state in which the plurality of stack units E are positioned with high accuracy.

In the apparatus 10 for manufacturing the power generating cell stack body 12 according to the above-described embodiment, the stack guide portion 90 is an upper portion of the column member 78 penetrating the stacking table 76 in the vertical direction, and the lower end portion of the column member 78 protrudes downward from the back surface 94 of the stacking surface 88 of the stacking table 76 and is connected to the vibration applying unit 80. In this case, vibration can be applied from the vibration applying unit 80 to the stack guide portion 90 with a simple configuration.

In the stacking table 76 of the apparatus 10 for manufacturing the power generating cell stack body 12 according to the above-described embodiment, the table support member 82 for supporting the stacking table 76 is provided in the vicinity of the column member 78 so as to protrude downward from the back surface 94, and the table support member 82 is provided with the floating support portion 84 for supporting the vibration applying unit 80 in a floating manner via the elastic member 86. In this case, it is possible to efficiently apply vibration from the vibration applying unit 80 to the stack guide portion 90.

The floating support portion 84 of the apparatus 10 for manufacturing the power generating cell stack body 12 according to the above-described embodiment has the vibration guide hole 106 formed therethrough along the vertical direction, the vibration guide hole 106 is disposed below the vibration applying unit 80, the vibration applying unit 80 is provided with the vibration guide unit 96 inserted through the vibration guide hole 106 so as to be movable in the vertical direction, and the elastic member 86 is disposed between the peripheral portion of the vibration guide hole 106 of the floating support portion 84 and the vibration applying unit 80 so as to be elastically deformable in the vertical direction. In this case, it is possible to favorably apply the vertical vibration from the vibration applying unit 80 to the stack guide portion 90.

In the apparatus 10 for manufacturing the power generating cell stack body 12 according to the embodiment described above, the elastic member 86 is a coil spring, the vibration guide unit 96 is inserted inside the elastic member 86, and the receiving groove 108 into which the lower end portion of the elastic member 86 is inserted is provided in the peripheral portion of the vibration guide hole 106 of the floating support portion 84. In this case, with a simple configuration in which the lower end portion of the elastic member 86 that is a coil spring is inserted into the receiving groove 108, it is possible to support the vibration applying unit 80 in a floating manner.

The present invention is not limited to the embodiments described above, and various modifications are possible without departing from the essence and gist of the invention.

What is claimed is:

1. A method for manufacturing a power generating cell stack body by stacking on a stacking table a plurality of stack units each including a membrane electrode assembly having electrodes disposed on both sides of an electrolyte membrane and a separator wherein the membrane electrode assembly and the separator are stacked onto each other, the method comprising:
   a preparation step of preparing the stacking table provided with a vibratable stack guide portion projecting upward from the stacking table, and the stack units provided with a positioning portion guided by the stack guide portion;
   a stacking step of stacking the stack units on the stacking table by causing the stack units to drop toward the stacking table while causing the positioning portion to slide along the stack guide portion that is vibrated in a vertical direction,
   wherein the stacking step involves providing a table support member connected to the stacking table and protruding downward from a back surface of a stacking surface of the stacking table, and providing a floating support portion attached to the table support member and supporting a vibration applying unit in a floating manner via an elastic member.

2. The method according to claim 1,
   wherein the stack guide portion has a rod shape protruding upward from the stacking table, and
   the positioning portion is an insertion hole or an insertion groove into which the stack guide portion is inserted, and
   wherein, in the stacking step, the stack unit is dropped and stacked on the stacking table while the stack guide portion that has been vibrated is inserted into the positioning portion.

3. The method according to claim 2,
   further comprising a removing step in which after the plurality of stack units are stacked on the stacking table in the stacking step, the plurality of stack units are removed from the stacking table together with the stack guide portion while the plurality of stack units are in a state in which the stack guide portion is inserted into the positioning portion.

4. The method according to claim 1,
   wherein in the stacking step, at least one of a frequency and an amplitude of vibration applied to the stack guide portion is changed in accordance with the number of stack units stacked on the stacking table.

5. An apparatus for manufacturing a power generating cell stack body by stacking a plurality of stack units each including a membrane electrode assembly having electrodes disposed on both sides of an electrolyte membrane and a separator wherein the membrane electrode assembly and the separator are stacked onto each other, the apparatus comprising:

a stacking table having a stacking surface on which the stack units are stacked;

a stack guide portion projecting upward from the stacking surface;

a vibration applying unit that applies vibration to the stack guide portion in a vertical direction;

a table support member connected to the stacking table and protruding downward from a back surface of the stacking surface of the stacking table; and a floating support portion attached to the table support member and supporting the vibration applying unit in a floating manner via an elastic member, wherein the stack units are stacked on the stacking table wherein the stack units are caused to drop toward the stacking surface while a positioning portion provided in each of the stack units is caused to slide along the stack guide portion to which the vibration has been applied by the vibration applying unit.

6. The apparatus according to claim 5, wherein the stack guide portion has a rod shape that is able to be inserted into the positioning portion that is an insertion hole or an insertion groove provided in each of the stack units.

7. The apparatus according to claim 6, wherein the stack guide portion is removable from the stacking table together with the plurality of stack units in a state where the stack guide portion has been inserted into the positioning portion of the plurality of stacking units stacked on the stacking table.

8. The apparatus according to claim 6, wherein the stack guide portion is an upper portion of a column member penetrating the stacking table in the vertical direction, and a lower portion of the column member protrudes downward from the back surface of the stacking surface of the stacking table and is connected to the vibration applying unit.

9. The apparatus according to claim 5, wherein a vibration guide hole is formed in the floating support portion so as to penetrate the floating support portion in the vertical direction, the vibration guide hole is disposed below the vibration applying unit, the vibration applying unit is provided with a vibration guide unit that is inserted into the vibration guide hole so as to be movable in the vertical direction, and the elastic member is disposed between a peripheral portion of the vibration guide hole of the floating support portion and the vibration applying unit so as to be elastically deformable in the vertical direction.

10. The apparatus according to claim 9, wherein the elastic member is a coil spring, the vibration guide unit is inserted into the elastic member, and a peripheral portion of the vibration guide hole of the floating support portion is provided with a receiving groove into which a lower end portion of the elastic member is inserted.

11. The apparatus according to claim 5, wherein the vibration applying unit changes at least one of a frequency and an amplitude of vibration applied to the stack guide unit according to the number of stack units stacked on the stacking table.

* * * * *